(12) United States Patent
Park

(10) Patent No.: US 10,341,159 B2
(45) Date of Patent: Jul. 2, 2019

(54) HEAD-END DEVICE AND METHOD OF RECOVERING SYNCHRONIZATION DETECTION ERROR USING THE SAME

(71) Applicant: SOLiD, INC., Seongnam-si, Gyeonggi-do (KR)

(72) Inventor: Jitaek Park, Seoul (KR)

(73) Assignee: SOLiD, INC., Seongnam-si (KR)

(*) Notice: Subject to any disclaimer, the term of this patent is extended or adjusted under 35 U.S.C. 154(b) by 0 days.

(21) Appl. No.: 15/883,628

(22) Filed: Jan. 30, 2018

(65) Prior Publication Data

US 2018/0219715 A1 Aug. 2, 2018

(30) Foreign Application Priority Data

Jan. 31, 2017 (KR) ........................ 10-2017-0013905

(51) Int. Cl.
| | |
|---|---|
| *H04L 27/26* | (2006.01) |
| *H04L 7/06* | (2006.01) |
| *H04B 10/272* | (2013.01) |
| *H04L 12/46* | (2006.01) |
| *H04J 11/00* | (2006.01) |
| *H04L 12/28* | (2006.01) |
| *H04W 56/00* | (2009.01) |
| *H04J 14/02* | (2006.01) |

(52) U.S. Cl.
CPC ...... *H04L 27/2657* (2013.01); *H04J 11/0069* (2013.01); *H04L 7/06* (2013.01); *H04L 12/4625* (2013.01); *H04B 10/272* (2013.01); *H04J 14/0245* (2013.01); *H04L 12/2801* (2013.01); *H04W 56/00* (2013.01)

(58) Field of Classification Search
CPC ... H04L 27/2657; H04L 7/06; H04L 12/4625; H04L 12/2801; H04B 10/272
See application file for complete search history.

(56) References Cited

U.S. PATENT DOCUMENTS

| | | | |
|---|---|---|---|
| 2014/0270787 A1* | 9/2014 | Lee | H04B 10/25753 398/116 |
| 2015/0319109 A1* | 11/2015 | Ranson | H04L 49/557 370/242 |
| 2016/0088623 A1* | 3/2016 | Ben-Shlomo | H04B 1/48 370/280 |
| 2016/0270016 A1* | 9/2016 | Harel | H04B 7/04 |
| 2017/0064642 A1* | 3/2017 | Tarlazzi | H04B 17/19 |
| 2017/0127288 A1* | 5/2017 | Shim | H04B 7/026 |
| 2017/0317722 A1* | 11/2017 | Lange | H04B 7/022 |

* cited by examiner

*Primary Examiner* — David S Huang
(74) *Attorney, Agent, or Firm* — Sughrue Mion, PLLC

(57) ABSTRACT

A method of recovering a synchronization detection error according to an embodiment includes: determining whether a base station signal input to a head-end device is detected; determining whether a head-end signal output from the head-end device, which is obtained by processing the base station signal by the head-end device, is detected by a lower device of the head-end device; determining whether synchronization of the head-end signal is detected based on the head-end signal input to the lower device; and changing a set frequency band or performing automatic gain control of the head-end device based on whether the base station signal is detected, whether the head-end signal is detected, and whether the synchronization of the head-end signal is detected

10 Claims, 7 Drawing Sheets

HEAD-END DEVICE AND METHOD OF RECOVERING SYNCHRONIZATION DETECTION ERROR USING THE SAME

BACKGROUND

1. Field

One or more embodiments relate to a head-end device and a method of recovering a synchronization detection error using the same, and more particularly, to a head-end device capable of recovering a synchronization detection error based on whether a base station signal is detected, whether a head-end signal is detected, and whether synchronization of a head-end signal is detected, and a method of recovering a synchronization detection error using the same.

2. Description of the Related Art

Due to the development of mobile communication, the usage of mobile communication by users is rapidly increasing, and the users want to be provided with a stable communication service without restriction of time and space. However, it is difficult for a service provider to provide a smooth communication service to users because a shadow area exists due to the limited output of a base station, the limitation of a location of the base station, and the surrounding terrain. To solve the problem, a distributed antenna system (DAS) is being used.

The DAS is installed in an area where radio waves are not received or where radio waves are weak, such as inside buildings, underground buildings, subways, tunnels, and apartment complexes in a residential area to extend a coverage of a base station by providing communication services to even a shadow area where signals of the base station are difficult to reach. The DAS includes a head-end device communicatively connected to the base station and at least one remote device connected to the head-end device through an optical transmission medium and communicatively connected to a user terminal.

SUMMARY

One or more embodiments include a head-end device capable of recovering a synchronization detection error based on whether a base station signal is detected, whether a head-end signal is detected, and whether synchronization of a head-end signal is detected, and a method of recovering a synchronization detection error using the same.

According to an example embodiments, a method of recovering synchronization detection error includes determining whether a base station signal input to a head-end device is detected, determining whether a head-end signal output from the head-end device, which is obtained by processing the base station signal by the head-end device, is detected by a lower device of the head-end device, determining whether synchronization of the head-end signal is detected based on the head-end signal input to the lower device and changing a set frequency band or performing automatic gain control of the head-end device based on whether the base station signal is detected, whether the head-end signal is detected, and whether the synchronization of the head-end signal is detected.

According to an example embodiment, the changing of the set frequency band or the performing of the automatic gain control comprises:

changing the set frequency band when the base station signal is detected and the head-end signal is not detected.

According to an example embodiment, the changing of the set frequency band comprises, changing a set frequency band selected from among a plurality of selectable set frequency bands in a predetermined order, in a base station interface unit included in the head-end device.

According to an example embodiment, the method further comprising: determining again whether the head-end signal is detected after the selected set frequency band is changed.

According to an example embodiment, the changing of the set frequency band comprises, changing the selected set frequency band in the predetermined order until the head-end signal is detected.

According to an example embodiment, the changing of the set frequency band or the performing of the automatic gain control comprises, performing the automatic gain control when the base station signal and the head-end signal are detected but the synchronization of the head-end signal is not detected.

According to an example embodiment, the performing of the automatic gain control comprises, performing the automatic gain control such that a gain of other frequency bands excluding a frequency band of the base station signal is lowered.

According to an example embodiment, the method further comprising, determining again whether the synchronization of the head-end signal is detected after the automatic gain control is performed.

According to an example embodiment, the method further comprising, generating a synchronization detection error notification when the synchronization detection of the head-end signal fails as a result of re-determination of whether the synchronization of the head-end signal is detected.

According to an example embodiment, a head-end device comprising, a base station signal level monitoring module configured to determine whether a base station signal input to the head-end device is detected, a lower device signal receiving module configured to receive a first lower device signal that is generated according to whether a head-end signal output from the head-end device, which is obtained by processing the base station signal by the head-end device, is detected by a lower device of the head-end device, and a second lower device signal that is generated according to whether synchronization of the head-end signal based on the head-end signal input to the lower device of the head-end unit is detected; and a synchronization detection error correction module configured to change a set frequency band or perform automatic gain control of the head-end device based on whether the base station signal is detected, whether the head-end signal is detected, and whether the synchronization of the head-end signal is detected.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
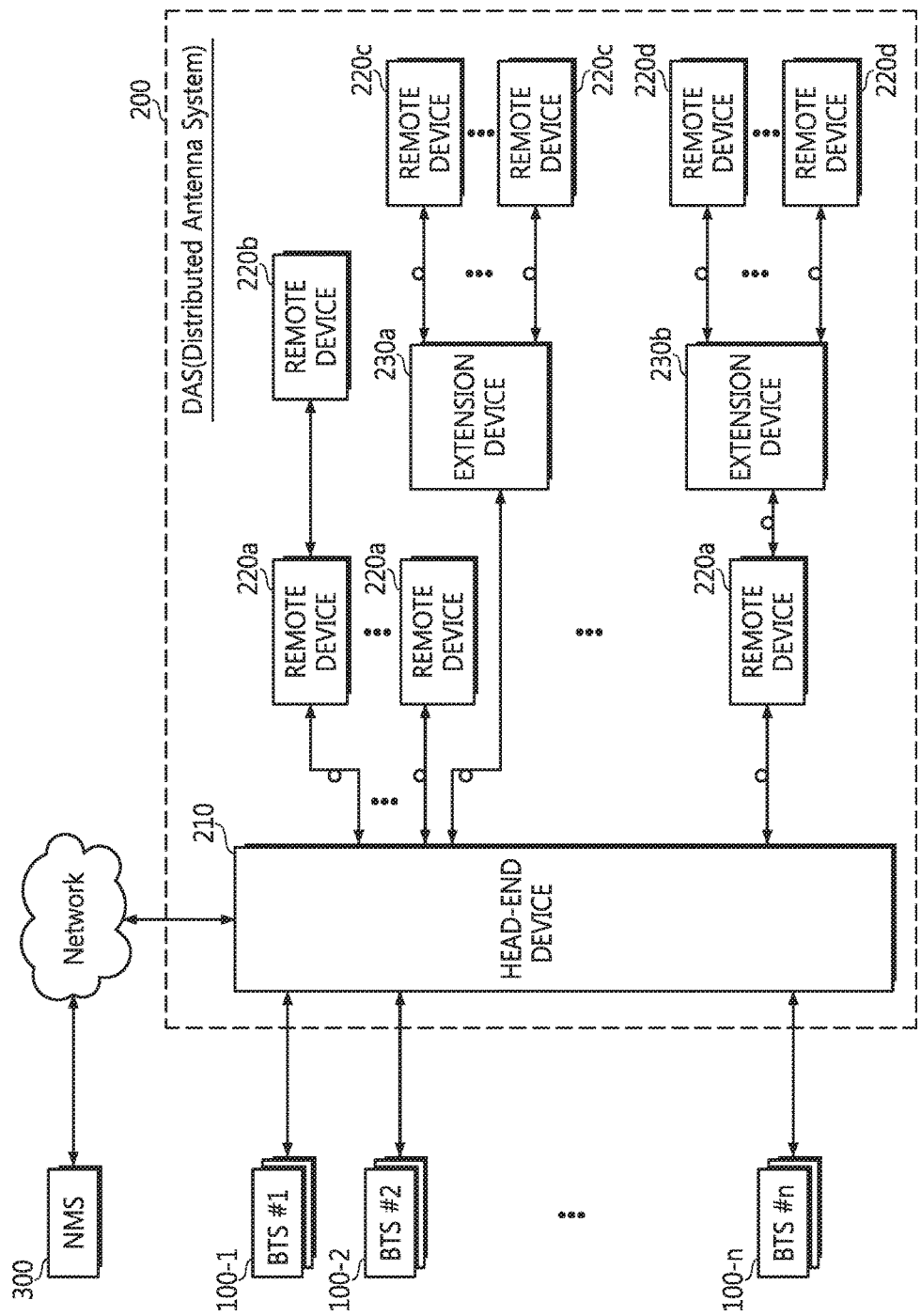
FIG. 1 is a block diagram of a distributed antenna system according to an embodiment.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation. Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

The distributed antenna system according to an embodiment of the inventive concept improves a poor propagation environment in a building, improves a poor received signal strength indication (RSSI) and the overall reception sensitivity of a mobile terminal, chip energy/other interferences (Ec/Io), and provides a mobile communication service to every corner of the building so that a user of the mobile communication service can freely talk anywhere in the building.

The distributed antenna system according to an embodiment of the inventive concept may support the mobile communication standard used worldwide. For example, the distributed antenna system may support a time division duplex (TDD) service as well as a frequency division duplex (FDD) service, a very-high frequency (VHF), an ultra-high frequency (UHF), and frequencies of 700 MHz, 800 MHz, 850 MHz, 900 MHz, 1900 MHz, 2100 MHz, and 2600 MHz bands. Furthermore, the distributed antenna system may support a number of mobile communication standards such as a typical analog mobile communication service, that is, an advanced mobile phone service (AMPS), digital time-division multiple access (TDMA), code-division multiple access (CDMA), wideband code-division multiple access (WCDMA), high-speed downlink packet access (HSDPA), long-term evolution (LTE), LTE-advanced (LTE-A), and so on.

Hereinafter, embodiments of the inventive concept will be described in detail in turn.

FIG. 1 is a block diagram of a distributed antenna system (DAS) 200 according to an embodiment.

Referring to FIG. 1, the DAS 200 may include a head-end device 210 that constitutes a head-end node and are communicatively connected to a plurality of base transceiver stations (BTS), i.e., base station 100-1 to 100-n, a plurality of remote devices 220a, 220b, 220c, and 220d that constitute a remote node and are connected to another remote node or communicatively connected to a user terminal by being arranged at each remote service location, and extension devices 230a and 230b that constitute an extension node.

According to an embodiment, the DAS 200 may be implemented as an analog DAS. However, the inventive concept is not limited thereto.

According to another embodiment, the DAS 200 may be implemented as a digital DAS, and in some cases may be implemented as a mixed form thereof (e.g., some nodes perform analog processing and the other nodes perform digital processing).

Hereinafter, a case where the DAS 200 is implemented as an analog DAS will be described as an example.

Meanwhile, FIG. 1 shows an example of a topology of the DAS 200 and various variations are possible in the DAS 200 considering specificity of installation areas and application fields (e.g., in-building, a subway, a hospital, a stadium, etc.) That is, the number of the head-end device 210, the remote devices 220a, 220b, 220c, and 220d, and the extension devices 230a and 230b, and a connection relationship between upper and lower ends thereof may be different from those of FIG. 1.

For example, the extension devices 230a and 230b in the DAS 200 may be utilized when the number of branches of the head-end device 210 is limited compared to the number of remote devices to be installed.

Each node in the DAS 200 and its function will be described in more detail. First, the head-end device 210 may serve as an interface with a base station. FIG. 1 shows that head-end device 210 is connected to the plurality of BTS 100-1 to 100-n (where n is a natural number of 2 or more).

According to an embodiment, the head-end device 210 may be implemented as a main head-end device and a sub head-end device, and may be connected to a base station for each service frequency band of a specific service provider or a base station for each sector. In some cases, the main head-end device may compensate for coverage by the sub head-end device.

In general, since a radio frequency (RF) signal transmitted from a base station is a high-power signal, the head-end device 210 may attenuate such a high-power RF signal into a signal of power suitable for processing at each node. The head-end device 210 may lower a high-power RF signal for each frequency band or for each sector to a low-power RF signal. The head-end device 210 may be combined with the low-power RF signal and may distribute the combined signal to the extension device 230a or the remote device 220a.

The extension device 230a may transmit the distributed combined signal to the remote device 220c connected to the extension device 230a.

The extension device 230b is connected to one end of the remote device 220a and may receive the signal distributed from the head-end device 210 through the remote device 220a. The extension device 230b may transmit the distributed signal to the remote device 220d connected to the extension device 230b.

Each of the remote devices 220a, 220b, 220c, and 220d may separate the received combined signals for each frequency band and perform signal processing such as amplification. Accordingly, a remote device located at the last end of the remote devices 220a, 220b, 220c, and 220d may transmit a base station signal to a user terminal in its service coverage through a service antenna (not shown).

The remote device 220a and the remote device 220b may be connected to each other through an RF cable or wireless communication, and a plurality of remote devices may be connected to each other in a cascade structure if necessary.

Although FIG. 1 shows that the plurality of BTS 100-1 to 100-n and the head-end device 210 are mutually connected through an RF cable, and further mutually connected through an optical cable at a lower end of the head-end device 210 except for the remote device 220a and the remote device 220b, a signal transport medium and a communication method between nodes may vary.

For example, at least one of between the head-end device 210 and the extension device 230a, between the head-end device 210 and the remote device 220a, between the extension devices 230a and 230b and the remote device 220c and 220d may be connected through an RF cable, a twisted cable, a UTP cable or the like in addition to the optical cable.

However, the following description will be made with reference to FIG. 1. Therefore, in the DAS 200, the head-end device 210, the remote devices 220a, 220b, 220c, and 220d, and the extension devices 230a and 230b may include an optical transceiver module for transmitting and receiving optical signals through electro-optical conversion/photo-electric conversion, and may further include a wavelength division multiplexing (WDM) device when nodes are connected to each other by a single optical cable.

The DAS 200 may be connected to an external management device (not shown) such as a network management server or a network management system (NMS) 300 or a network operation center (NOC) (not shown) via a network. Accordingly, an administrator may remotely monitor the status and problem of each node of the DAS 200, and may remotely control the operation of each node.

Figure 2:
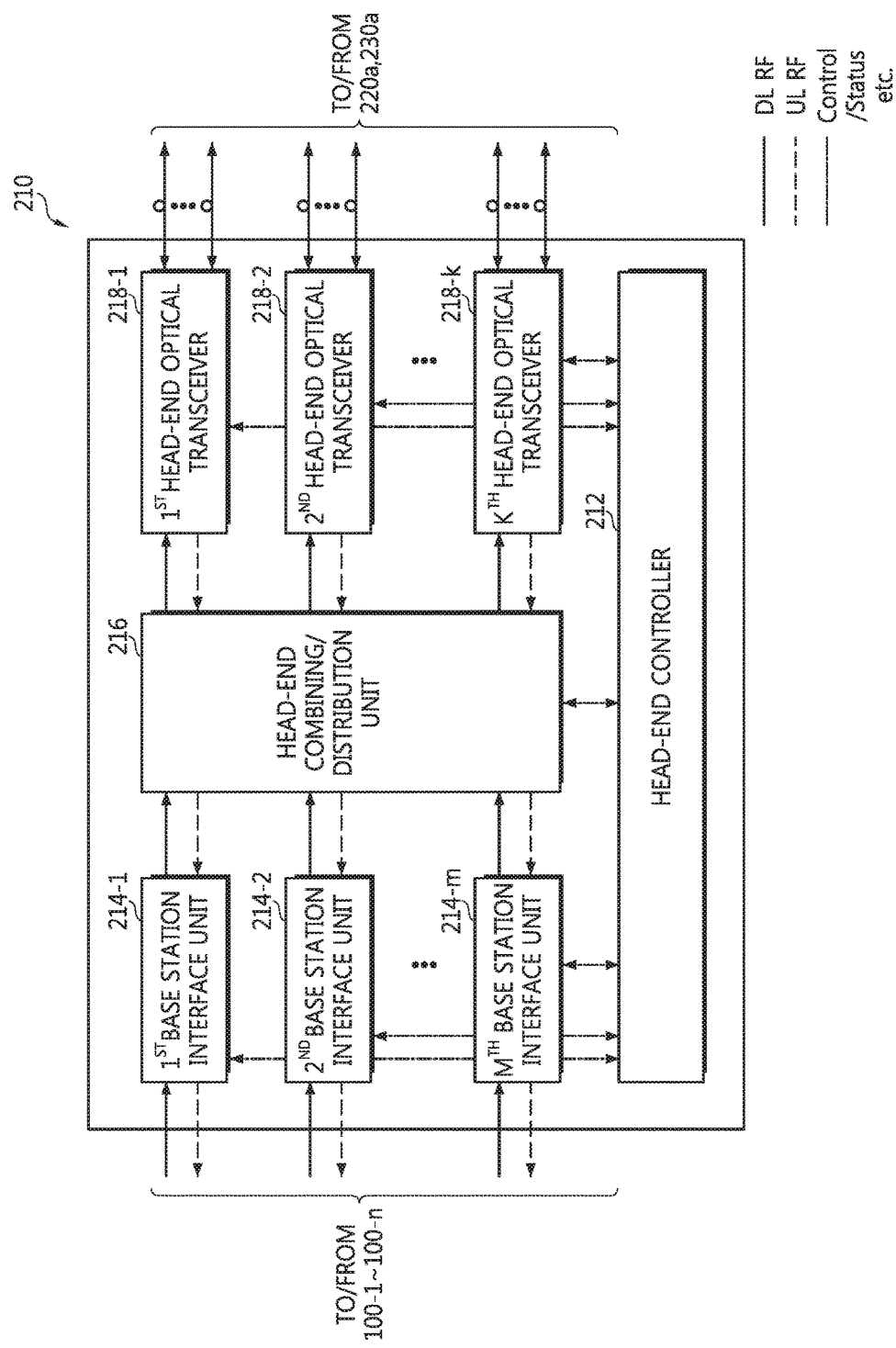
FIG. 2 is a block diagram according to an embodiment of a head-end device in FIG. 1.

FIG. 2 is a block diagram according to an embodiment of the head-end device 210 in FIG. 1.

Referring to FIGS. 1 and 2, the head-end device 210 may include a head-end controller 212, a plurality of base station interface units 214-1 to 214-m, a head-end combining/distribution unit 216, and a plurality of head-end optical transceivers 218-1 to 218-k.

The head-end controller 212 may control at least one of the plurality of base station interface units 214-1 to 214-m, the head-end combining/distribution unit 216, and the plurality of head-end optical transceivers 218-1 to 218-k.

According to an embodiment, the head-end controller 212 may receive a head-end control signal from an external device, for example, the NMS 300 or an administrator's terminal communicatively connected to the head-end controller 212 via a network, and may control at least one of the plurality of base station interface units 214-1 to 214-m, the head-end combining/distribution unit 216, and the plurality of head-end optical transceivers 218-1 to 218-k according to the received head-end control signal. A link between the head-end controller 212 and the external device may be implemented as an Ethernet link or the like, but is not limited thereto.

Furthermore, the head-end controller 212 may generate a signal related to status information about at least one of the plurality of base station interface units 214-1 to 214-m, the head-end combining/distribution unit 216, and the plurality of head-end optical transceivers 218-1 to 218-k, and may transmit the generated signal related to status information to an external device.

A detailed configuration and operation of the head-end controller 212 will be described in detail with reference to FIGS. 3 to 5.

Each of the plurality of base station interface units 214-1 to 214-m may be connected to a corresponding one of the plurality of BTS 100-1 to 100-n. According to an embodiment, at least two or more of the plurality of base station interface units 214-1 to 214-m may be connected to any one of the plurality of BTS 100-1 to 100-n.

Each of the plurality of base station interface units 214-1 to 214-m may receive a downlink RF signal from a corresponding one of the plurality of BTS 100-1 to 100-n. According to an embodiment, the plurality of base station interface units 214-1 to 214-m may receive and interface downlink RF signals having different frequency bands, respectively.

Each of the plurality of base station interface units 214-1 to 214-m may adjust power of the received downlink RF signal and output the downlink RF signal to the head-end combining/distribution unit 216.

Each of the plurality of base station interface units 214-1 to 214-m may receive a plurality of combined uplink transmission signals from the head-end combining/distribution unit 216. The uplink transmission signals may include uplink RF signals having different frequency bands received from user terminals through the remote devices 220a, 220b, 220c, and 220d or the extension devices 230a and 230b.

Each of the plurality of base station interface units 214-1 to 214-m may extract an uplink RF signal corresponding to a predetermined frequency band (e.g., a frequency band of a downlink RF signal) from a plurality of combined uplink transmission signals.

Each of the plurality of base station interface units 214-1 to 214-m may adjust power of the extracted uplink RF signal and output the uplink RF signal to a corresponding base station.

The head-end combining/distribution unit 216 may combine the downlink RF signals output from the plurality of base station interface units 214-1 to 214-m. Hereinafter, the combined downlink RF signals are referred to as downlink transmission signals. The head-end combining/distribution unit 216 may distribute the downlink transmission signals to the plurality of head-end optical transceivers 218-1 to 218-k, respectively.

The head-end combining/distribution unit 216 may combine the uplink transmission signals output from the plurality of head-end optical transceivers 218-1 to 218-k. The head-end combining/distribution unit 216 may distribute the combined uplink transmission signals to the plurality of base station interface units 214-1 to 214-m.

Each of the plurality of head-end optical transceivers 218-1 to 218-k may generate a downlink optical signal by electro-optically converting an input downlink transmission signal. Each of the plurality of head-end optical transceivers 218-1 to 218-k may transmit the generated downlink optical signal to the remote device 220a or the extension device 230a through a corresponding optical transmission medium.

Each of the plurality of head-end optical transceivers 218-1 to 218-k may receive an uplink optical signal from the remote device 220a or the extension device 230a through a corresponding optical transmission medium. Each of the plurality of head-end optical transceivers 218-1 to 218-k may photoelectrically convert the input uplink optical signal to restore the same into an uplink transmission signal. Each of the plurality of head-end optical transceivers 218-1 to 218-k may output the restored uplink transmission signal to the head-end combining/distribution unit 216.

Figure 3:
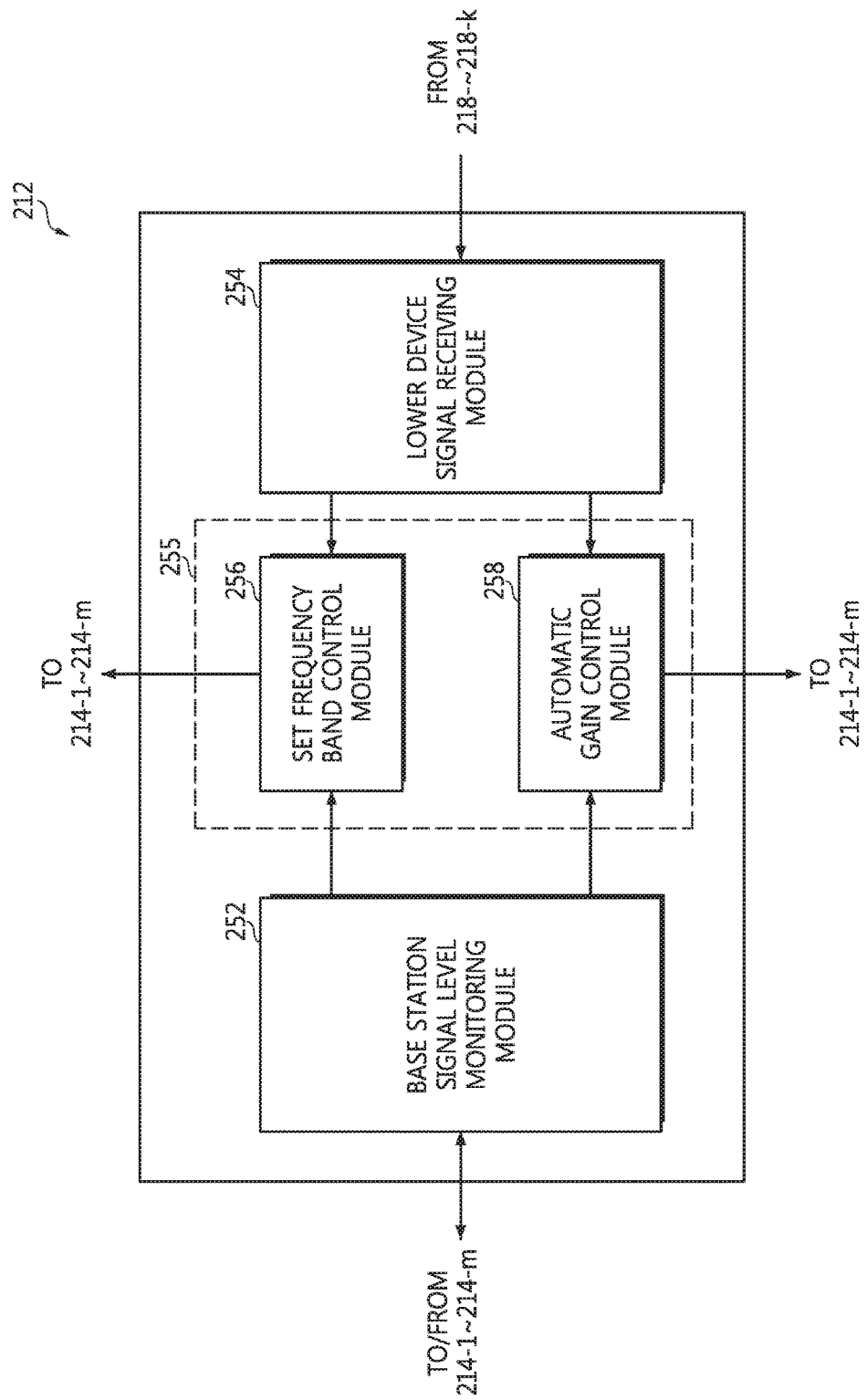
FIG. 3 is a block diagram according to an embodiment of a head-end controller in FIG. 2.

FIG. 3 is a block diagram according to an embodiment of the head-end controller 212 in FIG. 2.

Referring to FIGS. 1 to 3, the head-end controller 212 may include a base station signal level monitoring module 252, a lower device signal receiving module 254, and a synchronization detection error correction module 255.

The base station signal level monitoring module 252 may receive a downlink RF signal (hereinafter referred to as a base station signal) input to the head-end device 210 through the plurality of base station interface units 214-1 to 214-m.

The base station signal level monitoring module 252 may monitor a level of the received base station signal and may determine whether the base station signal is detected according to a result of the monitoring.

For example, the base station signal level monitoring module 252 may determine that the base station signal is detected when the level of the base station signal being monitored exceeds a reference value.

The base station signal level monitoring module 252 may transmit a result signal indicating whether the base station signal is detected to each of a set frequency band control module 256 and an automatic gain control module 258 of the synchronization detection error correction module 255.

The lower device signal receiving module 254 may receive a first lower device signal that is generated according to whether a downlink optical signal (hereinafter referred to as a head-end signal) output from the head-end device 210 after the base station signal is processed by the head-end device 210 is detected by a lower device of the head-end device 210.

The "lower device of the head-end device 210" may broadly refer to devices located at a rear end of the head-end device 210 on the basis of downlink communication. For example, the remote devices 220a, 220b 220c, and 220d or the extension devices 230a and 230b may correspond to the lower device of the head-end device 210.

The lower device signal receiving module 254 may receive a second lower device signal that is generated according to whether synchronization of a head-end signal based on a head-end signal input to the lower device of the head-end unit 210 is detected.

In the specification, the term "synchronization" may be used in a broad sense including a synchronous signal used for synchronizing devices or synchronous data included in a signal.

A process of generating and transmitting the first lower device signal and the second lower device signal in the lower device of the head-end device 210 will be described in detail with reference to FIG. 6.

The lower device signal receiving module 254 may transmit at least one of the received first lower device signal and second lower device signal to each of the set frequency band control module 256 and the automatic gain control module 258 of the synchronization detection error correction module 255.

According to an embodiment, the head-end controller 212 may not include the lower device signal receiving module 254, wherein the first lower device signal and the second lower device signal may be directly input to the synchronization detection error correction module 255. That is, the lower device signal receiving module 254 may be configured as one unit with the synchronization detection error correction module 255.

The synchronization detection error correction module 255 may correct a synchronization detection error of the DAS 200 based on at least one of a result signal indicating whether a base station signal received from the base station signal level monitoring module 252 is detected, and a first lower device signal and a second lower device signal received from the lower device signal receiving module 254.

That is, the synchronization detection error correction module 255 may correct a synchronization detection error of the DAS 200 based on at least one of whether a base station signal is detected, whether a head-end signal is detected, and whether synchronization of a head-end signal is detected.

The synchronization detection error correction module 255 may include the set frequency band control module 256 and the automatic gain control module 258.

When a base station signal is detected and a head-end signal is not detected, the set frequency band control module 256 may control the plurality of base station interface units 214-1 to 214-m such that a set frequency band selected by each of the plurality of the base-station interface units 214-1 to 214-m is changed. A process of controlling a set frequency band to be changed in each of the plurality of base station interface units 214-1 to 214-m will be described in detail with reference to FIGS. 4 and 5.

When a base station signal is detected, a head-end signal is detected, and synchronization of the head-end signal is not detected, the automatic gain control module 258 may control the plurality of base station interface units 214-1 to 214-m such that automatic gain control is performed in each of the plurality of the base-station interface units 214-1 to 214-m.

According to an embodiment, the automatic gain control module 258 may control the plurality of base station interface units 214-1 to 214-m such that a gain of base station signals corresponding to other frequency bands excluding a frequency band of a base station signal corresponding to the head-end signal for which synchronization is not detected is lowered.

A process of performing automatic gain control under the control of the automatic gain control module 258 in each of the plurality of base station interface units 214-1 to 214-m will be described in detail with reference to FIG. 4.

Figure 4:
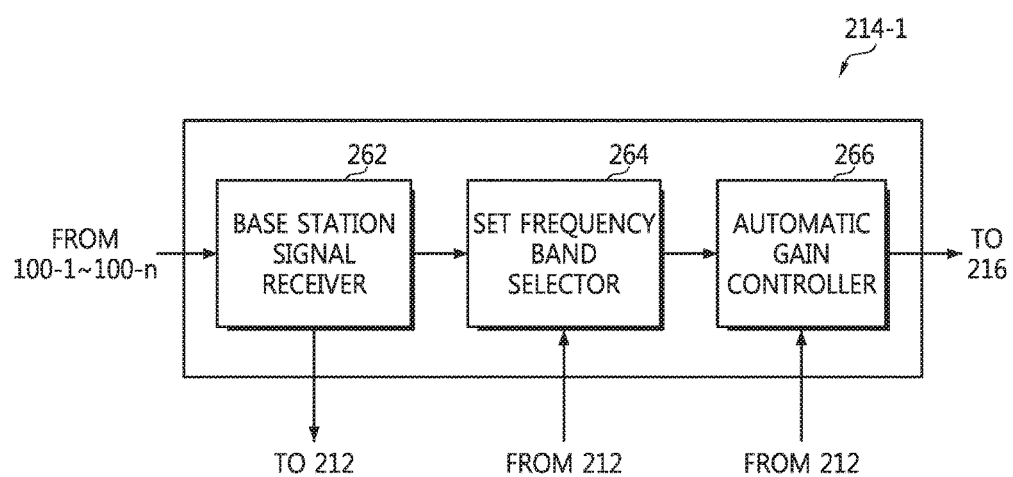
FIG. 4 is a block diagram according to an embodiment of a first base station interface unit in FIG. 2.

FIG. 4 is a block diagram according to an embodiment of the first base station interface unit 214-1 in FIG. 2.

Although FIG. 4 shows the first base station interface unit 214-1 as an example from among the plurality of base station interface units 214-1 to 214-m, the remaining base station interface units 214-2 to 214-1 may also be configured to operate in the same manner and in substantially the same structure as the first base station interface unit 214-1.

Furthermore, FIG. 4, for convenience of description, shows configurations of the first base station interface unit 214-1 for downlink communication as an example, wherein the first base station interface unit 214-1 may additionally include configurations for uplink communication.

Referring to FIGS. 2 to 4, the first base station interface unit 214-1 may include a base station signal receiver 262, a set frequency band selector 264, and an automatic gain controller 266.

The base station signal receiver 262 may receive a base station signal from the plurality of BTS 100-1 to 100-n, and may attenuate the received base station signal, which is a high-power RF signal, into a signal of power suitable for processing at each node and output the attenuated signal.

According to an embodiment, the base station signal receiver 262 may transmit the received base station signal to the head-end controller 212 for level measurement of the base station signal.

The set frequency band selector 264 may select and output only a frequency band set in a frequency band of a base station signal output from the base station signal receiver 262. As a frequency band of a base station signal is selected and output by the set frequency band selection unit 264, interference and noise due to a wide frequency band covered by the first base station interface unit 214-1 may be removed.

According to an embodiment, the set frequency band selector 264 may divide the frequency band covered by the first base station interface unit 241-1 into a lower band (LB), a middle band (MB), and an upper band (UB), and may be set in advance so as to process any one of the divided frequency bands.

In this case, the set frequency band selector 264 needs to set an appropriate frequency band to be selected by the first base station interface unit 214-1 according to a frequency band of a received base station signal, and the base station signal cannot be transmitted to a lower end of the first base station interface unit 214-1 when a frequency band not corresponding to the frequency band of the base station signal is set.

The set frequency band selector 264 may set any one frequency band selected from a plurality of frequency bands in advance and may change the set frequency band under the control of the head-end controller 212. For example, the set frequency band selector 264 may set the frequency band to LB first and then sequentially change the set frequency band to MB and UB under the control of the head-end controller 212.

A detailed structure and operation of the set frequency band selector 264 will be described with reference to FIG. 5.

The automatic gain controller 266 may control a gain of a base station signal transmitted from the set frequency band selector 264.

According to an embodiment, the automatic gain controller 266 may perform automatic gain control under the control of the head-end controller 212. When a base station signal and a head-end signal are detected but synchronization of the head-end signal is not detected, the automatic gain controller 266 included in each of a plurality of base station interface units corresponding to other frequency bands excluding a frequency band of the base station signal may perform automatic gain control such that a gain of a base station signal corresponding to the other frequency bands is lowered.

The automatic gain controller 266 may output the gain-controlled base station signal to the head-end combining/distribution unit 216.

According to an embodiment, the first base station interface unit 214-1 may further include a unit for performing other functions and may be implemented by excluding at least one of the base station signal receiver 262, the set frequency band selector 264, and the automatic gain controller 266.

Figure 5:
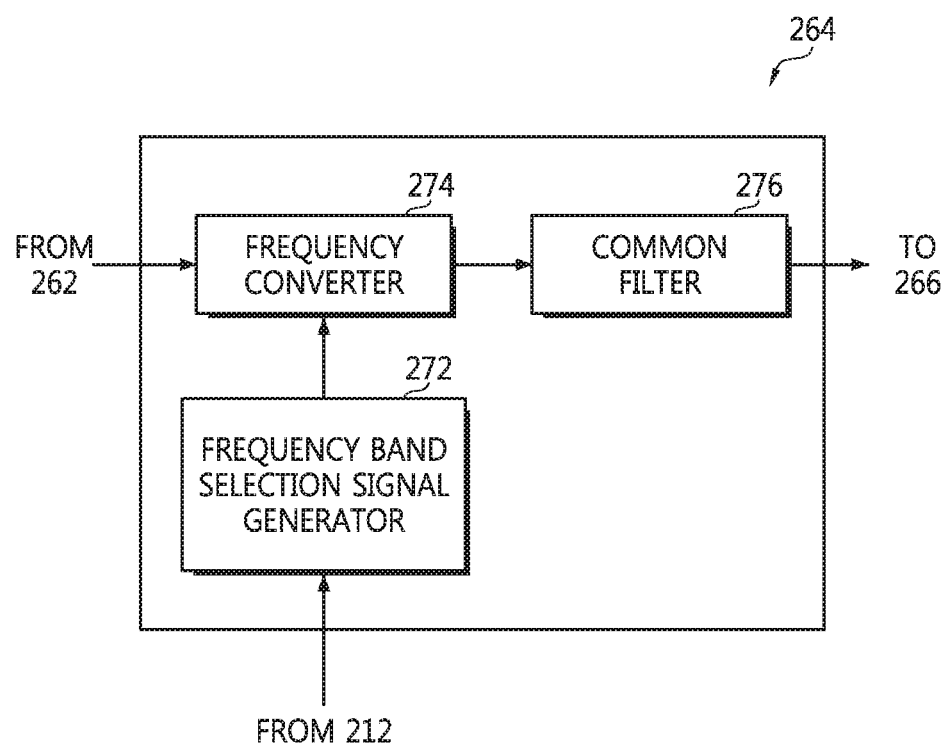
FIG. 5 is a block diagram according to an embodiment of a set frequency band selector in FIG. 4.

FIG. 5 is a block diagram according to an embodiment of the set frequency band selector 264 in FIG. 4.

Referring to FIGS. 4 and 5, the set frequency band selector 264 may include a frequency band selection signal generator 272, a frequency converter 274, and a common filter 276.

The frequency band selection signal generator 272 may generate a frequency band selection signal according to a control signal received from the head-end controller 212.

According to an embodiment, when it is determined that a baseband signal is detected by the head-end controller 212 but a head-end signal is not detected and a set frequency band needs to be changed, the frequency band selection signal generator 272 may change the set frequency band under the control of the head-end controller 212.

According to an embodiment, the frequency band selection signal generator 272, under the control of the head-end controller 212, may output a frequency band selection signal corresponding to a frequency band to be changed, for example, a phase-locked loop (PLL) signal, to the frequency converter 274.

The frequency converter 274 may convert a frequency of a base station signal received from the base station signal receiver 262 using the frequency band selection signal output from the frequency band selection signal generator 272.

According to an embodiment, the frequency converter 274 may include a combiner for converting a frequency of a base station signal by combining a frequency band selection signal and the base station signal.

The common filter 276 may filter a base station signal converted and output from the frequency converter 274 and output the base station signal to the automatic gain controller 266.

According to an embodiment, the common filter 276 may include a filter for filtering only some frequency bands from among the frequency bands covered by the first base station interface unit 214-1. That is, a pass band of the filter included in the common filter 276 may be designed to be narrower than the frequency band covered by the first base station interface unit 214-1.

Figure 6:
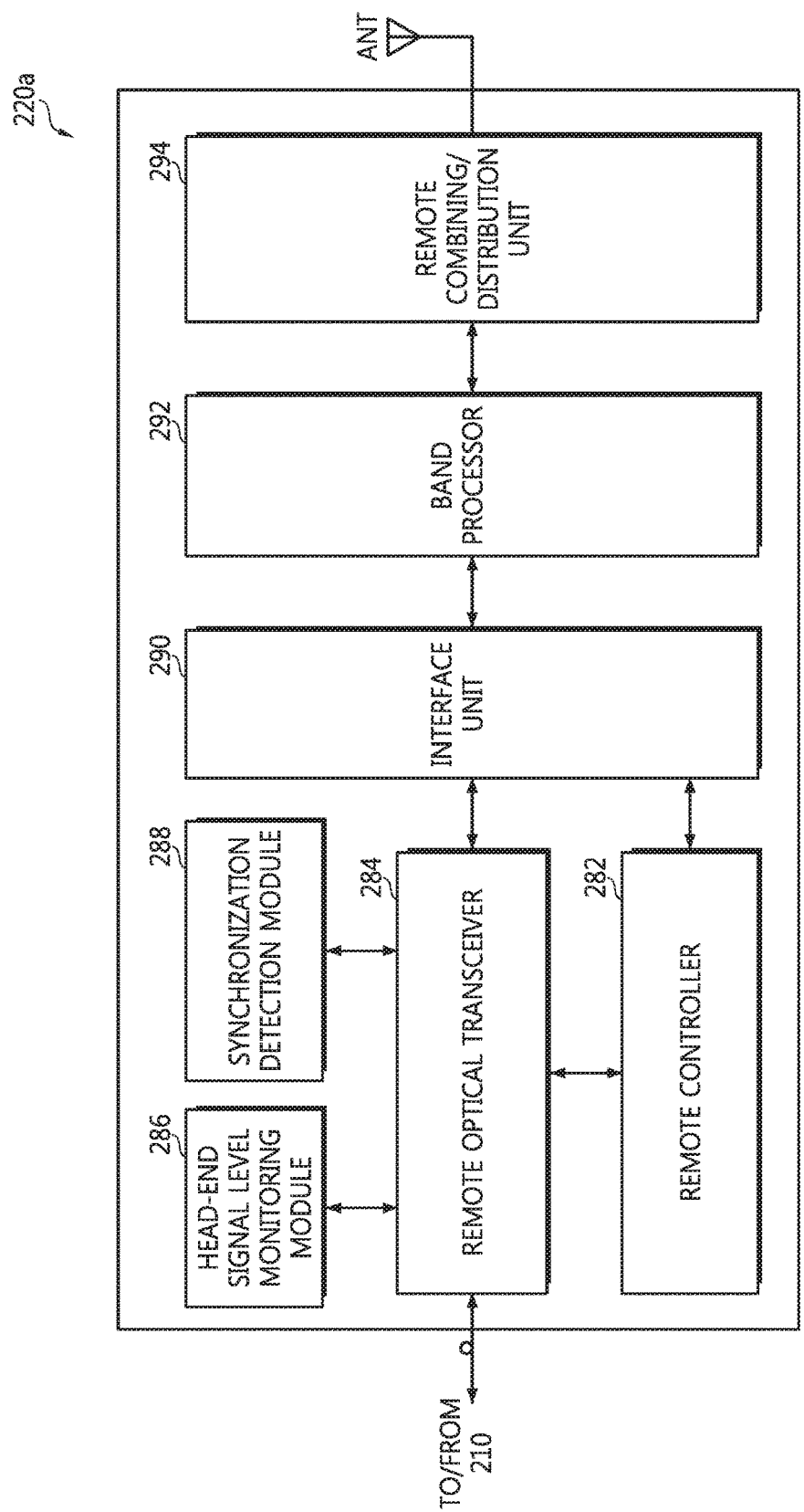
FIG. 6 is a block diagram according to an embodiment of a remote device in FIG. 1.

FIG. 6 is a block diagram according to an embodiment of the remote device 220a in FIG. 1.

Although FIG. 6 shows the remote device 220a as an example, the remaining remote devices 220b, 220c, and 220d may also be configured to operate in the same manner and in substantially the same structure as the remote device 220a, and the extension devices 230a and 230b may also be configured to include a head-end signal level monitoring module 286 and a synchronization detection module 288 of the remote device 220a.

Referring to FIGS. 1 and 6, the remote device 220a may include a remote controller 282, a remote optical transceiver 284, the head-end signal level monitoring module 286, the synchronization detection module 288, an interface unit 290, a band processor 292, and a remote combining/distribution unit 294.

The remote controller 282 may monitor operation states of the remote optical transceiver 284 and the interface unit 290 or may control operations of the remote optical transceiver 284 and the interface unit 290.

According to an embodiment, the remote controller 282 may include a signal conversion device (e.g., a modem or the like). The remote controller 282 may process a status information request signal, a delay measurement signal, and the like received from the head-end device 210 through the signal conversion device, and may generate a status information signal, a delay response signal, and the like in response to the processed status information request signal, delay measurement signal, and the like. The remote controller 282 may transmit the generated status information signal, delay response signal, and the like to the head-end device 210.

The remote optical transceiver 284 may receive a downlink optical signal, that is, a head-end signal from the head-end device 210, and may photoelectrically convert the received head-end signal. The remote optical transceiver 284 may output the photoelectrically converted head-end signal to each of the head-end signal level monitoring module 286, the synchronization detection module 288, and the interface unit 290.

The head-end signal level monitoring module 286 may receive the head-end signal transmitted from the head-end device 210 and photoelectrically converted by the remote optical transceiver 284. The head-end signal level monitoring module 286 may monitor a level of the received base station signal and may determine whether the head-end signal is detected according to a result of the monitoring.

For example, the head-end signal level monitoring module 286 may determine that the head-end signal is detected when the level of the head-end signal being monitored exceeds a reference value.

The head-end signal level monitoring module 286 may transmit a detection result signal of the head-end signal to the head-end device 210 through the remote optical transceiver 284.

The synchronization detection module 288 may receive the head-end signal transmitted from the head-end device 210 and photoelectrically converted by the remote optical transceiver 284. The synchronization detection module 288 may detect synchronization of the received head-end signal.

The synchronization detection module 288 may transmit information about the detected synchronization of the head-end signal to the remote controller 282. A result of the synchronization detection of the head-end signal may be transmitted to the head-end device 210 through the remote optical transceiver 284.

The interface unit 290 may receive the head-end signal photoelectrically converted by the remote optical transceiver 284 and output the received head-end signal to the band processor 292 along a predetermined downlink path.

The band processor 292 may perform various signal processing such as amplification for each signal band with respect to the head-end signal transmitted from the interface unit 290.

The remote combining/distribution unit 294 may combine downlink signals processed by and output from the band processor 292 and transmit the downlink signals to an antenna ANT.

The remote combining/distribution unit 294 may receive an uplink signal transmitted from a user terminal through the antenna ANT. The remote combining/distribution unit 294 may distribute the uplink signals transmitted through the antenna ANT to correspond to a structure of the band processor 292 and transmit the uplink signals to the band processor 292.

A configuration of the remote device 220a in FIG. 6 is merely an exemplary structure, and various modifications are possible for the remaining configurations including the head-end signal level monitoring module 286 and the synchronization detection module 288.

Figure 7:
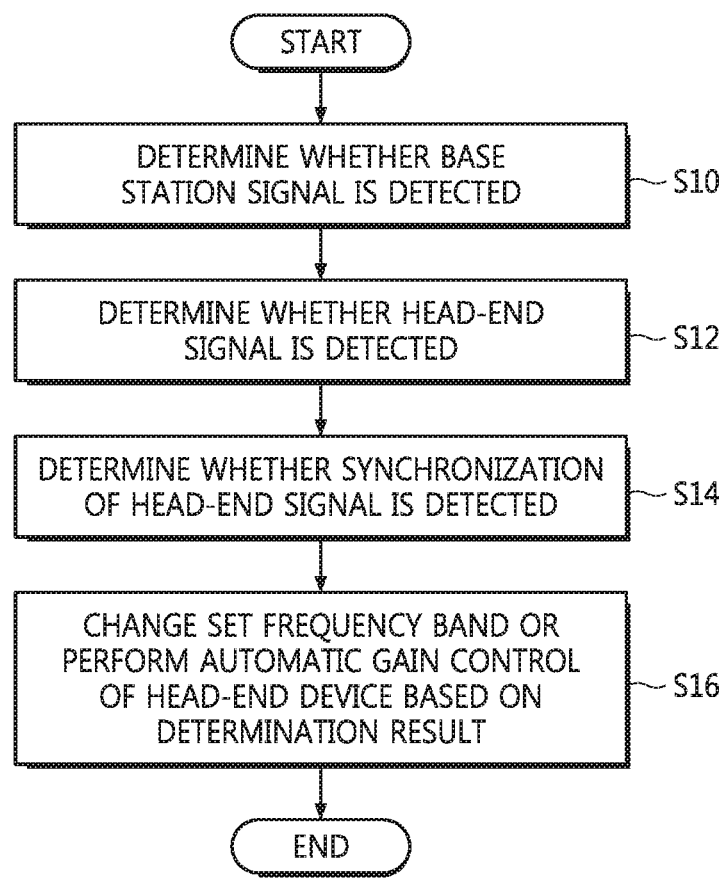
FIG. 7 is a flowchart of a method of recovering a synchronization detection error according to an embodiment.

FIG. 7 is a flowchart of a method of recovering a synchronization detection error according to an embodiment.

Referring to FIGS. 1 to 7, in operation S10, the base station signal level monitoring module 252 of the head-end controller 212 may determine whether a base station signal is detected.

In operation S12, the head-end signal level monitoring module 286 of the remote device 220a may determine whether a head-end signal is detected, and may transmit a determination result signal to the head-end controller 212 of the head-end device 210.

According to an embodiment, the head-end signal level monitoring module 286 of a remote device (e.g., 220a) may only determine a level of a head-end signal and transmit information about the level of the head-end signal to the head-end controller 212 of the head-end device 210, and may further determine whether the head-end signal is detected by the head-end controller 212.

In operation S14, the synchronization detection module 288 of a remote device (e.g., 220a) may determine whether synchronization of a head-end signal is detected, and may transmit a determination result signal to the head-end controller 212 of the head-end device 210.

According to an embodiment, the synchronization detection module 288 of the remote device (e.g., 220a) may only detect synchronization of a head-end signal and transmit information about the synchronization of the head-end signal to the head-end controller 212 of the head-end device 210, and may further determine whether the synchronization of the head-end signal is detected by the head-end controller 212.

In operation S16, the head-end controller 212 of the head-end device 210, based on at least one of whether a base station signal is detected, whether a head-end signal is detected, and whether synchronization of a head-end signal is detected, may change a set frequency band or perform automatic gain control in the plurality of base station interface units 214-1 to 214-m of the head-end device 210.

According to an embodiment, when a base station signal is detected and a head-end signal is not detected, the head-end controller 212 may control a corresponding base station interface unit to change the set frequency band in the base station interface units 214-1 to 214-m.

Here, the head-end controller 212 may change a set frequency band selected from among a plurality of set frequency bands (e.g., LB, MB, and UB) in a predetermined order.

After the set frequency band in the base station interface units 214-1 to 214-m is changed under the control of the head-end controller 212, a lower device of the head-end device 210, for example, the remote unit 220a, may be determined again whether a head-end signal is detected.

As a result of the determination, the head-end controller 212 may change the set frequency band selected from among the base station interface units 214-1 to 214-m in a predetermined order until a head-end signal is detected. According to an embodiment, the head-end controller 212 may generate a synchronization detection error notification when a change is made to all selectable set frequency bands under the control of the head-end controller 212.

According to another embodiment, when a base station signal is detected, a head-end signal is detected, and synchronization of the head-end signal is not detected, the head-end controller 212 may control the plurality of base station interface units 214-1 to 214-m such that a gain of base station signals corresponding to other frequency bands excluding a frequency band of a base station signal corresponding to the head-end signal for which synchronization is not detected is lowered. According to another embodiment, when a base station signal is detected, a head-end signal is detected, and synchronization of the head-end signal is not detected, the head-end controller 212 may control a corresponding base station interface unit such that a gain of a base station signal corresponding to the head-end signal for which synchronization is not detected is high.

After the automatic gain control is performed, the lower device of the head-end device 210, for example, the remote unit 220a, may be determined again whether synchronization of a head-end signal is detected. As a result of the determination, if synchronization of a head-end signal is not detected, the head-end controller 212 may generate a synchronization detection error notification.

The method and device according to embodiments of the inventive concept may perform recovery based on the exact cause of a synchronization detection error by recovering the synchronization detection error based on whether a base station signal is detected, whether a head-end signal is detected, and whether synchronization of a head-end signal is detected.

Hereinabove, the inventive concept has been described with reference to the preferred embodiments of the inventive concept. However, it will be appreciated by those skilled in the art that various modifications and changes of the inventive concept can be made without departing from the spirit and the scope of the inventive concept which are defined in the appended claims and their equivalents.

What is claimed is:

1. A method of recovering synchronization detection error, the method comprising:
    determining whether a base station signal input to a head-end device is detected;
    determining whether a head-end signal output from the head-end device, which is obtained by processing the base station signal by the head-end device, is detected by a lower device of the head-end device;
    determining whether synchronization of the head-end signal is detected based on the head-end signal input to the lower device; and
    changing a set frequency band or performing automatic gain control of the head-end device based on whether the base station signal is detected, whether the head-end signal is detected, and whether the synchronization of the head-end signal is detected.

2. The method of claim 1, wherein the changing of the set frequency band or the performing of the automatic gain control comprises:
    changing the set frequency band when the base station signal is detected and the head-end signal is not detected.

3. The method of claim 2, wherein the changing of the set frequency band comprises:
    changing the set frequency band selected from among a plurality of selectable set frequency bands in a predetermined order, in a base station interface unit included in the head-end device.

4. The method of claim 3, further comprising:
    determining again whether the head-end signal is detected after the selected set frequency band is changed.

5. The method of claim 4, wherein the changing of the set frequency band comprises:
    changing the selected set frequency band in the predetermined order until the head-end signal is detected.

6. The method of claim 1, wherein the changing of the set frequency band or the performing of the automatic gain control comprises:
    performing the automatic gain control when the base station signal and the head-end signal are detected but the synchronization of the head-end signal is not detected.

7. The method of claim 6, wherein the performing of the automatic gain control comprises:
    performing the automatic gain control such that a gain of other frequency bands excluding a frequency band of the base station signal is lowered.

8. The method of claim 7, further comprising:
    re-determining whether the synchronization of the head-end signal is detected after the automatic gain control is performed.

9. The method of claim 8, further comprising:
    generating a synchronization detection error notification when the synchronization of the head-end signal is not detected as a result of the re-determining.

10. A head-end device comprising:
    a base station signal level monitor configured to determine whether a base station signal input to the head-end device is detected;
    a lower device signal receiver configured to receive a first lower device signal that is generated according to whether a head-end signal output from the head-end device, which is obtained by processing the base station signal by the head-end device, is detected by a lower device of the head-end device, and a second lower device signal that is generated according to whether synchronization of the head-end signal based on the head-end signal input to the lower device of the head-end device is detected; and
    a synchronization detection error corrector configured to change a set frequency band or perform automatic gain control of the head-end device based on whether the base station signal is detected, whether the head-end signal is detected, and whether the synchronization of the head-end signal is detected.

\* \* \* \* \*